United States Patent Office 3,436,386
Patented Apr. 1, 1969

3,436,386
PURIFICATION OF POLYOLEFINS
Elwin A. Harris, Wilmington, Del., assignor to Hercules Incorporated, a corporation of Delaware
No Drawing. Filed Apr. 16, 1965, Ser. No. 448,376
Int. Cl. C08f 27/00, 1/88
U.S. Cl. 260—93.7          15 Claims

ABSTRACT OF THE DISCLOSURE

An improved polyolefin work-up process is taught which comprises quenching the polymerization slurry with butanol to deactivate the catalyst, then prior to water washing, treating the slurry with a small amount of an alkylene oxide in the presence of a small amount of water. The resulting polymers exhibit substantially less corrosivity to metal than do those treated by previously known aqueous work-up techniques.

---

The present invention relates to a process for the purification of stereoregular polyolefins prepared by a low-pressure process in a liquid diluent.

There are known processes for polymerizing ethylene and other 1-olefins under relatively mild conditions of temperature and pressure by using as a catalyst for the polymerization a reduced titanium halide in the presence of an organoaluminum compound as an activator. The polymerization is usually carried out by adding the catalyst and activator to an inert organic diluent, preferably a hydrocarbon having no ethylenic unsaturation, which is liquid under the reaction conditions, and passing the ethylene or other olefin into the catalyst diluent mixture at atmospheric or slightly elevated pressure and at room temperature or slightly above. When an olefin is so polymerized, a highly crystalline polymer is obtained which has many industrial uses. In the course of the polymerization, the polymer, which is insoluble in the reaction medium, precipitates out and can be separated from the diluent by any of the usual means such as filtration, centrifugation, etc.

Reduced titanium halides are those in which the titanium exhibits a valence less than four, i.e. a valence of two or three. The perferred reduced titanium compound is titanium trihalide, a term which is used rather loosely to refer to pure TiCl₃ as well as to other compositions where TiCl₃ is cocrystallized with various aluminum compounds. For example, a material sold commercially as titanium trichloride and employed as an olefin polymerization catalyst is actually a cocrystal of titanium and aluminum chlorides having the empirical formula AlTi₃Cl₁₂. Other compounds referred to as titanium trichloride can be prepared by reducing TiCl₄ with hydrogen, metallic titanium or titanium monoxide. Another popular method of preparing titanium trichloride comprises reducing TiCl₄ with an organoaluminum compound such as a trialkylaluminum or an alkylaluminum halide. Here again the product of the reaction is not simple TiCl₃, but titanium trichloride cocrystallized with other materials such as AlCl₃ or with AlCl₃ and an organoaluminum halide.

The dihalides of titanium can also be used as catalysts. There are prepared generally by a further reduction of the trihalides with for example Grignard reagents, organometallic compounds such as organoaluminum compounds, with elemental titanium or aluminum, or aluminum halides. Here again the resulting product is not usually pure titanium dihalide, but a cocrystal.

The organoaluminum compound which is used as an activator is a compound having at least one hydrocarbon radical linked to aluminum. Exemplary of such compounds are trialkyl aluminums such as triethyl, tripropyl and trioctylaluminum, inter alia; dialkylaluminum halides such as dimethylaluminum chloride, dibutyl aluminum bromide, dioctylaluminum bromide, inter alia; and alkylaluminum dihalides such as ethylaluminum dichloride, propyl aluminum dibromide and butylaluminum dichloride.

As stated, catalyst systems based on the reduced titanium halides and organoaluminum compounds are the most efficient catalysts yet developed for the preparation of crystalline olefin polymers having a high degree of stereoregularity. However, large quantities of the catalyst and activator normally remain in the polymer after it is separated from the reaction diluent and these residues adversely affect the color, stability and electrical properties of the polymer and also render it corrosive to metal. Hence, it has been necessary to devise methods for purifying such polymers to rid them of these catalyst residues which are inherently present at the completion of the polymerization process.

Numerous methods for purifying the stereoregular polyolefins have been suggested. One such method comprises washing the polymer, after separation from the polymerization diluent, with mineral acids as, for example, methanolic hydrochloric acid, aqueous solutions of nitric acid, etc. This type of treatment gives very pure polymers but requires the use of considerable quantities of expensive reagents.

By another process which has been suggested, and which is in common usage, the polyolefin, while still slurried in the polymerization diluent, is treated with a low molecular weight alkanol such as methyl, ethyl, propyl, isopropyl, butyl alcohol, or the like to solubilize the catalyst residues. The alkanol-containing slurry is then washed with an aqueous liquid to extract the catalyst residues from the slurry. The diluent phase, containing the polymer, and the aqueous phase, containing the catalyst residues, are then separated, and the polymer is recovered from the diluent phase.

In U.S. Patent 2,974,132 to Jacobi et al., a variation of this latter technique is disclosed wherein the polymerization slurry, prior to the alkanol treatment, is contacted with about 1.1 to 1.5 moles of an olefin oxide for each reactive group present in the catalyst. The thus treated polymer slurry can then be further treated according to the process just described.

A further variation of the described technique is disclosed in French Patent 1,314,673, assigned to Farbwerke Hoechst A.G. In this variation, the polymer slurry is treated in the known manner with alcohol, followed by the water wash and separation of the polymer from the organic diluent. The separated polymer is then reslurried in water and treated with 0.05 to 0.3 mole of an alkylene oxide per mole of reactive group present in the catalyst.

Both of these variations are very efficient in reducing the total quantity of catalyst residues which remain in the polymer after the purification. However, it has been observed that, even though the amount of residual catalyst in the polymer is relatively small, the polymers purified by these methods are corrosive to metal in varying degree, particularly during later extruding and molding operations when the polymer is maintained at a high temperature. This corrosivity is believed to be caused by halogen acids resulting from breakdown of halogen-containing residues produced by the decomposition of the alkyl aluminum compound and titanium halide with alcohol and water.

It is the object of this invention to provide a process for deactivating and removing catalyst residues from polyolefins prepared with reduced titanium halide catalysts activated with organoaluminum compounds whereby a polymer is prepared having greatly reduced corrosivity to metal. Briefly stated, the improved process comprises polymerizing an α-olefin with a reduced titanium halide-organoaluminum compound catalyst in an inert organic diluent to form a slurry, quenching the polymerization with an alcohol, and treating the alcohol-quenched slurry, prior to the water wash, with a relatively small amount of water and an alkylene oxide. The alkylene oxide must be present after the small amount of water has reacted with the catalyst residues. Thereafter the purification process is continued in the known manner by washing the slurry with an aqueous liquid, separating the aqueous and organic phases, and recovering the polymer from the organic phase.

The addition of both water and alkylene oxide at the specified stage of the process is required for the successful operation of the invention. It is important that the amount of water no exceed about one mole per mole of halide residue in the slurry. It has been found that greater amounts of water at this point result in lessened efficiency of halide removal and in insolubilization of a portion of the titanium residues within the polymer.

Preferably, the water will be added in the amount of about 0.4 to about 0.9 mole per equivalent of halide residue in the slurry, and the alkylene oxide in amounts of at least one mole per halide equivalent.

The alkylene oxide which is used in the process of the invention is preferably, though not necessarily, in relatively low molecular weight oxide which is normally liquid and which is miscible with water. Examples of such alkylene oxides include ethylene oxide, propylene oxide, butylene oxide, butadiene dioxide, pentene oxide, hexene oxide, styrene oxide, glycidol, and the like. Propylene and butylene oxide are particularly useful members of the class.

The order of addition of the water and alkylene oxide is not critical so long as it meets the requirement of having the alkylene oxide present after the reaction of the water with the catalyst residues. Thus, the water can be added first and permitted to react, following which the alkylene oxide is added to neutralize the products of the reaction of water with the catalyst residues. Alternatively, the alkylene oxide can be added first and then the water. In this case, the alkylene oxide is present to neutralize the water-catalyst reaction products as they are formed.

In either of the above embodiments of the invention, it is preferable to add the water as a solution in an alcohol which is readily miscible with the polymerization medium. This can be the same alcohol as was used for quenching the polymerization or it can be a different alcohol, so long as it is readily miscible with the polymerization diluent. It is also possible to add plain water, but this method leads to certain difficulties which are caused by the slow incorporation of the water into the reaction medium containing the quench alcohol.

Another alternative embodiment of the invention comprises adding the water as a solution in the alkylene oxide. This embodiment affords great ease of handling reagents, and is quite satisfactory if the operation is conducted rapidly enough that the solution is added to the slurry before any significant amount of hydrolysis of the ethylene oxide by the water can take place.

Regardless of what sequence or method of addition of water and oxide is followed, and even though one of the more preferred methods is not used, the technique of the invention yields polyolefins of considerably lessened corrosivity as compared to those of the prior art wherein the alkylene oxide is not added in the presence of a small amount of water prior to the water wash.

The corrosivity reduction accomplished by the process of this invention is the primary means of evaluating its efficacy. Corrosivity is determined by measuring the gain in weight per unit of specimen surface area of a metal specimen maintained in contact with the polymer during a high temperature molding operation. The polymer is considered to be satisfactory in this regard if the metal specimen exhibits a weight gain no greater than 0.02 mg./cm.$^2$.

The corrosivity test in the following examples was conducted as follows: 1.65 grams of unstabilized polymer powder was spread in a uniform layer in a 2 x 2 x .062 inch mold cavity. A carefully cleaned sheet steel specimen measuring 1.375 x 1.375 x .010 inches was placed upon this layer and covered with another uniform layer of 1.65 grams of the polymer powder. The mass was compressed for one hour at 250° C. After cooling, the polymer was stripped from the specimen and the specimen was weighed, then suspended for one hour in boiling water vapors, dried and reweighed. The corrosivity is expressed as milligrams gained per square centimeter of surface area.

Corrosivity is further evaluated by visually inspecting the metal specimens after molding and noting the degree of rusting or blackening thereof. The degree of rust formation or blackening is, of course, greater as corrosivity increases.

Yet another measure of the efficacy of the method of the invention in removing catalyst residues is the ash content. This is a measure of the metal residues remaining in the polymer after processing.

The invention will now be illustrated by means of several examples, in which various embodiments thereof will be demonstrated. All parts and percentages are by weight unless otherwise indicated.

Examples 1–9

A polymerization was conducted by passing propylene gas into a reaction vessel containing 1500 parts of a hydrocarbon diluent, 3.23 parts of a catalyst consisting of the reaction product of $TiCl_4$ and ethylaluminum sesquichloride and having an Al/Ti ratio of about 0.537, and 3.36 parts diethylaluminum chloride. The hydrocarbon diluent was a petroleum fraction boiling between 170 and 200° C. Propylene was fed at 120 grams/hour at a temperature of 50° C. for about 5 hours. At the end of this time propylene pressure had risen to about 40 p.s.i.a. Hydrogen was added throughout to control molecular weight. Gas feed was then shut off and the reaction was continued for one-half hour longer. The reaction was then discontinued and the vessel purged with nitrogen. A slurry containing about 600 parts of crystalline polypropylene was recovered.

The slurry thus produced was divided into 9 equal aliquots. These were then treated according to the various embodiments of the invention. The results of such treatment in terms of corrosivity and ash content of the polymer are indicated in Table 1.

In Example 1 a control sample of the polymer slurry was worked up by the following steps:

(1) 3% isopropanol by volume based on hydrocarbon was added and agitated for 2 hours at 60° C.

(2) The slurry was neutralized by agitating at 60° C. with ¼ its volume of 1.37% by weight sodium hydroxide solution containing 1.1% by weight gluconic acid. The caustic solution was decanted and washed three times with hot water. Water was decanted after each washing.

(3) Polymer was filtered out of hydrocarbon phase.

(4) The polymer was steam distilled till all residual hydrocarbon was removed and then dried in vacuo.

In Example 2, the same procedure was followed except that the quench alcohol was n-butanol and between steps 1 and 2, 0.77 mole of $H_2O$ per equivalent of chlorine was added to the slurry in the form of a 17% solution of the $H_2O$ in n-butanol and the mass was agitated for 2½ hours.

In Example 3, the following sequence of steps was followed:

(1) 3% n-butanol by volume based on hydrocarbon was added and agitated for 2 hours at 60° C.

(2) 17% (by volume) solution of $H_2O$ in n-butanol was added to supply 0.77 mole $H_2O$ per equivalent of chloride in slurry, slurry agitated ½ hour.

(3) 2.31 moles propylene oxide per equivalent of chloride in slurry were added, slurry agitated for 2 hours.

(4) The work-up was continued as in steps 2 to 4 of Example 1.

Example 4 was performed exactly as Example 3, except that steps 2 and 3 were reversed in order and the propylene oxide was agitated for ½ hour while the water was agitated for two hours.

Example 5 followed Example 1, except that following step 1 an 8% solution of $H_2O$ in propylene oxide was added in sufficient quantity to supply 0.74 mole of $H_2O$ and 2.26 moles propylene oxide per equivalent of chloride. The mass was then agitated for 2.5 hours before proceeding to step 2.

Example 6 followed the procedure of Example 5 except that the slurry was quenched with 3% by volume of isopropanol.

Example 7 followed Example 6 except that the volume of alcohol employed in the quenching was 2%.

Example 8 followed Example 4 except that 3% by volume of isopropanol was added rather than n-butanol and 0.76 mole of water per equivalent of chloride was added in the form of a 10% solution in isopropanol.

In Example 9, the sequence of steps was as follows:

(1) 2% n-butanol by volume based on hydrocarbon was added and the slurry was agitated for two hours at 60° C (2) 0.8 mole of water was added per equivalent of chloride present in the slurry and the slurry was agitated for ½ hour at 60° C.

(3) 1.6 moles of propylene oxide per equivalent of chloride present in the slurry was added and the slurry was agitated for 2 hours at 60° C.

(4) The work-up was continued as in steps 2 to 4 of Example 1.

ratio of aluminum to titanium in the catalyst was 0.496. The resulting polymer was divided into aliquots and worked up as before to demonstrate various embodiments of the invention. The ash content and the results of the corrosivity test conducted on these materials are tabulated in Table 2.

Example 10 is a control sample worked up exactly as was Example 1.

Example 11 was worked up according to the following sequence of steps:

(1) 3% n-butanol by volume based on hydrocarbon was added and the slurry was agitated for 2 hours at 60° C.

(2) 0.81 mole of water per equivalent of chloride in the slurry was added and agitated for ½ hour. The water was added as a 17% solution in n-butanol.

(3) 2.43 moles of propylene oxide per equivalent of chloride in the slurry were added and the slurry was agitated for 2 hours.

(4) Work-up continued according to known process as in steps 2 to 4 of Example 1.

Example 12 was identical to Example 11 except that steps 2 and 3 were reversed in their sequence with the propylene oxide being agitated for ½ hour and the water for 2 hours.

In Examples 13, 14, 15 and 16, a water in propylene oxide solution was added immediately following the initial n-butanol quench step. In Examples 15 and 16, the agitation period for the butanol quench was reduced to ½ hour. The solutions were as follows:

Example 13.—8% water in propylene oxide sufficient to supply 0.77 mole $H_2O$ and 2.37 moles of propylene oxide per equivalent of chloride, agitated for 2 hours.

Example 14.—12% water in propylene oxide to supply 0.89 mole of water and 1.74 moles of propylene oxide per equivalent of chloride, agitated for 2 hours.

Example 15.—8% water in propylene oxide to supply 0.46 mole of water and 1.40 moles of propylene oxide per equivalent of chloride and agitated for ½ hour.

Example 16.—16% water in propylene oxide to supply 0.82 mole of water and 1.15 moles of propylene oxide per equivalent of chloride and agitated for ½ hour.

Example 17 was identical to Example 11 except that step 3 (propylene oxide treatment) was omitted.

Example 18 was identical to Example 11 except that step 2 (water treatment) was omitted.

Examples 19 and 20 followed Example 11 except that the quantities of reagents were changed as follows:

Example 19.—Quenched with 2% n-butanol, then 17% water in butanol to supply 0.81 mole of water per equivalent of chloride, then 1.06 moles of propylene oxide per equivalent of chloride.

Example 20.—Quenched with 2% n-butanol, then 17% water in butanol to supply 0.81 mole of water per equivalent of chloride, then 1.52 moles of propylene oxide per equivalent of chloride.

TABLE 1

| Example No. | $H_2O$/Cl ratio | PrO/Cl ratio | Ash content (Total Al+ Ti, p.p.m.) | Wt. gain (mg./sq. cm.) | Appearance [1] |
|---|---|---|---|---|---|
| 1 | | | 307 | 0.24 | Very poor—poor. |
| 2 | 0.77 | | 250 | 0.15 | Poor. |
| 3 | 0.77 | 2.31 | 95 | <0.01 | Good—very good. |
| 4 | 0.77 | 2.31 | 79 | 0.01 | Good. |
| 5 | 0.74 | 2.26 | 104 | 0.02 | Good—very good. |
| 6 | 0.74 | 2.26 | 130 | 0.01 | Fair—Good. |
| 7 | 0.74 | 2.26 | 142 | 0.03 | Fair. |
| 8 | 0.76 | 2.31 | 129 | 0.02 | Do. |
| 9 | 0.8 | 1.6 | 159 | <0.01 | Good—very good. |

[1] Very good=no rust, metal bright and shiny; good=scattered rust spots, metal generally bright; fair=light rust spots over most of surface; poor=entire surface rusted and discolored; very poor=heavy rust deposits over most of surface.

Examples 10–22

A second polymerization was conducted following the procedure outlined above except that in this case the Example 21 was identical with Example 15 except that the alcohol quench was effected with 3% isopropanol rather than n-butanol.

Example 22 was identical to Example 12 except that the alcohol quench was effected with 3% isopropanol rather than with n-butanol and the water was added as a 10% solution in isopropanol.

demonstrated with any polyolefin. For instance, the process can be used successfully in working up, among others, poly(butene-1), poly(4-methylpentene-1), polystyrene, and copolymers of ethylene and propylene.

TABLE 2

| Example No. | $H_2O/Cl$ ratio | PrO/Cl ratio | Ash content (Total Al+ Ti, p.p.m.) | Wt. gain (mg./sq. cm.) | Appearance |
|---|---|---|---|---|---|
| 10 | | | 167 | 0.16 | Poor. |
| 11 | 0.81 | 2.43 | 30 | 0.01 | Good—very good. |
| 12 | 0.81 | 2.43 | 17 | 0.00 | Very good. |
| 13 | 0.77 | 2.37 | 29 | <0.01 | Good—very good. |
| 14 | 0.89 | 1.74 | 35 | 0.01 | Good. |
| 15 | 0.46 | 1.40 | 54 | 0.01 | Do. |
| 16 | 0.82 | 1.15 | | 0.01 | Very good. |
| 17 | 0.81 | | 109 | 0.08 | Poor. |
| 18 | | 2.43 | 150 | >0.10 | Do. |
| 19 | 0.81 | 1.06 | 263 | 0.01 | Good. |
| 20 | 0.81 | 1.52 | 272 | 0.01 | Good—very good. |
| 21 | 0.46 | 1.40 | 209 | 0.01 | Good. |
| 22 | 0.80 | 2.43 | 57 | 0.00 | Very good. |

Ethylene was polymerized in a manner substantially the same as was used to form the polypropylene which was used in Examples 1 to 9. The catalyst was the reaction product of ethyl aluminum sequichloride with $TiCl_4$ and ethyl aluminum chloride. The aluminum to titanium ratio was 0.496. The resultant polymer slurry was divided into three aliquots. These were worked up substantially according to the procedure of French Patent 1,314,673, U.S. 2,974,132, and the instant application.

Example 23

This aliquot was heated for one hour at 80° C. with about 1.7% n-butanol. The quenched slurry was treated with 1.3 mmole propylene oxide per mmole of catalyst residues. The treated slurry was filtered and steam distilled to remove diluent, washed with water and dried. Corrosivity and appearance are recorded in Table 3.

Example 24

Example 23 was repeated with ethylene oxide substituted for propylene oxide.

Example 25

This aliquot was treated with 41.4 mmoles of propylene oxide per mmole of catalyst residues and agitated rapidly for one hour at 40° C. The slurry was then treated with about 1.7% n-butanol for one hour at 80° C., then washed three times with water, filtered, and steam distilled. Corrosivity is recorded in Table 3.

Example 26

Example 25 was repeated with ethylene oxide substituted for propylene oxide.

Example 27

This aliquot was quenched with 2.25% n-butanol for two hours at 80° C. About 1.43 moles of propylene oxide per equivalent of chloride was added and stirred for one-half hour. Then about 0.78 mole of water per equivalent of chloride residue was added in the form of a 17% solution in n-butanol and stirred for two hours. The polymere was then steam distilled and dried.

TABLE 3

| Example No. | Wt. gain (mg./sq. cm.) | Appearance | Ash Content |
|---|---|---|---|
| 23 | 0.22 | Very poor | 364 |
| 24 | 0.23 | do | 375 |
| 25 | 0.03 | do | 492 |
| 26 | 0.23 | do | 644 |
| 27 | 0.02 | Very good | 312 |

The comparative data clearly show the improved results effected by the procedure of this invention.

The method has been illustrated in the work-up of polyethylene and polypropylene. However, the improved corrosivity afforded by the method of the invention is Normally, higher bulk density polymers exhibit a greater propensity toward corrosivity than do those of lower bulk density. This is apparently due to the greater compactness of the granules whereby the metallic residues are tenaciously held and shielded from the action of the catalyst removal and deactivation reagents. As stated previously, corrosivity is believed to result from the breakdown of these halogen-containing catalyst compounds, liberating either halogen or halogen acid therefrom. For reasons which are not clearly understood, the method of the instant invention is more effective in decomposing these halogen-containing compounds during the polymer work-up so that little or no halogen remains to corrode processing equipment at a later point in the utilization of the polymer.

What I claim and desire to protect by Letters Patent is:

1. In the process for deactivating and removing catalyst residues from a slurry of a crude α-olefin polymer prepared with a reduced titanium halide catalyst in the presence of an organoaluminum activator wherein the slurry is quenched with a small quantity of an aliphatic alcohol and washed with an aqueous liquid, the improvement which comprises treating the quenched slurry, prior to the aqueous wash, with a small amount of water and an alkylene oxide.

2. The process of claim 1 wherein the slurry is treated with about 0.4 to 0.9 mole of water per equivalent of halide and more than 1 mole of alkylene oxide per equivalent of halide.

3. The process of claim 2 where the alkylene oxide is propylene oxide.

4. The process of claim 2 where the water is added to the alcohol-quenched slurry prior to the addition of the alkylene oxide, said water being added as an alcohol solution.

5. The process of claim 2 where the water is added to the alcohol-quenched slurry subsequent to the addition of the alkylene oxide, said water being added as an alcohol solution.

6. The process of claim 2 where the water and alkylene oxide are added simultaneously, said water being dissolved in the alkylene oxide.

7. The process of claim 2 where the catalyst is the reaction product of titanium tetrachloride and ethylaluminum sesquichloride and the activator is diethylaluminum chloride.

8. The process of claim 6 where the alkylene oxide is propylene oxide.

9. A process for reducing the corrosivity to metal of a polyolefin prepared with a titanium chloride-aluminum alkyl catalyst which comprises quenching the polymerization slurry with about 0.4 to 0.9 mole of water and more than one mole of propylene oxide per equivalent of chloride present in the slurry, washing the slurry with an aqueous liquid, and recovering the polymer from the liquid.

10. The process of claim 9 where the quenching alcohol is selected from the class consisting of butanol and isopropanol.

11. The process of claim 10 where the water is added as a solution in an aliphatic alcohol prior to the addition of the propylene oxide.

12. The process of claim 11 where the alcohol is isopropanol.

13. The process of claim 10 where the water is added as a solution in an aliphatic alcohol subsequent to the addition of the propylene oxide.

14. The process of claim 13 where the alcohol is isopropanol.

15. The process of claim 10 where the water is added simultaneously with the propylene oxide, said water being dissolved in the propylene oxide.

References Cited

UNITED STATES PATENTS 3,387,343   11/1966   Kutner.

FOREIGN PATENTS 1,314,673   2/1962   France.

JOSEPH L. SCHOFER, *Primary Examiner.*

L. EDELMAN, *Assistant Examiner.*

U.S. Cl. X.R.

260—94.9, 88.2, 93.5

UNITED STATES PATENT OFFICE
CERTIFICATE OF CORRECTION

Patent No. 3,436,386

April 1, 1969

Elwin A. Harris

It is certified that error appears in the above identified patent and that said Letters Patent are hereby corrected as shown below:

Column 8, line 73, after "with" insert -- an aliphatic alcohol, treating the quenched slurry with --.

Signed and sealed this 7th day of April 1970.

(SEAL)
Attest:

Edward M. Fletcher, Jr.
Attesting Officer

WILLIAM E. SCHUYLER, JR
Commissioner of Patents